(12) United States Patent
Keshavaraj et al.

(10) Patent No.: US 7,543,843 B2
(45) Date of Patent: Jun. 9, 2009

(54) AIRBAG COATINGS MADE WITH HYBRID RESIN COMPOSITIONS

(75) Inventors: Ramesh Keshavaraj, Peachtree City, GA (US); Shulong Li, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 140 days.

(21) Appl. No.: 11/503,007

(22) Filed: Aug. 10, 2006

(65) Prior Publication Data

US 2008/0036183 A1 Feb. 14, 2008

(51) Int. Cl.
*B60R 21/04* (2006.01)
(52) U.S. Cl. ..................... 280/728.1; 428/447
(58) Field of Classification Search ........... 525/104, 525/105; 524/861, 862; 280/728.1; 383/3; 442/64, 66; 428/447, 500, 521
See application file for complete search history.

(56) References Cited

U.S. PATENT DOCUMENTS

| | | | | |
|---|---|---|---|---|
| 4,945,125 A | | 7/1990 | Dillon et al. ............... 524/427 |
| 5,110,666 A | * | 5/1992 | Menzel et al. .............. 428/196 |
| 5,648,426 A | | 7/1997 | Zolotnitsky ................ 525/100 |
| 5,945,186 A | | 8/1999 | Li et al. .................... 428/36.1 |
| 6,169,043 B1 | | 1/2001 | Li ............................ 442/71 |
| 6,245,695 B1 | * | 6/2001 | Maruo et al. ............... 442/136 |
| 6,348,543 B1 | | 2/2002 | Parker ....................... 525/106 |
| 6,451,715 B2 | | 9/2002 | Li et al. ..................... 442/76 |
| 6,545,092 B2 | | 4/2003 | Parker ....................... 525/106 |
| 7,132,170 B2 | * | 11/2006 | Parker ....................... 428/447 |
| 2002/0111097 A1 | | 8/2002 | Parker ....................... 442/59 |
| 2004/0058601 A1 | | 3/2004 | Parker ....................... 442/76 |
| 2004/0063803 A1 | | 4/2004 | Kim et al. .................. 522/1 |
| 2005/0100692 A1 | | 5/2005 | Parker ....................... 428/34.1 |
| 2006/0217018 A1 | | 9/2006 | Parker ....................... 442/59 |

FOREIGN PATENT DOCUMENTS

WO WO 99/65677 * 12/1999

* cited by examiner

*Primary Examiner*—Arti Singh-Pandey
(74) *Attorney, Agent, or Firm*—Cheryl J. Brickey

(57) ABSTRACT

The present disclosure is directed to the use of specific hybrid resins as airbag coatings. Preferably, the polymers used to create these hybrid resins, as described herein, are urethanes blended with acrylates, vinyls, silicones, and combinations thereof, where at least one of the components has a glass transition temperature of 20° C. or less. The urethanes are preferably of the polycarbonate, polytetramethyleneglycol, silicon-based diol, or olefin-based diol type. The hybrid resins may be produced in an aqueous dispersion, in a solvent, or by mixing the polymers together where one polymer is dissolved directly into a second polymer to form a continuous matrix. The resulting hybrid resins exhibit a tensile strength of at least 1,000 p.s.i. and an elongation at break of at least about 200%.

11 Claims, No Drawings

AIRBAG COATINGS MADE WITH HYBRID RESIN COMPOSITIONS

TECHNICAL FIELD

The present disclosure relates to the use of a hybrid resin composition as a coating for airbag fabrics. The hybrid resin composition forms an interpenetrating polymer network (IPN), which imparts desired properties to the airbag, such as tensile strength and softness, while being less expensive than other coating materials that may be used alone or in combination. The polymers used to create IPNs, as described herein, are urethanes, which are blended with acrylates, vinyls, silicones, and combinations thereof. The present hybrid resin coatings may be used alone or in combination with other single or multi-component airbag coatings to achieve the desired properties of air permeability, tensile strength, and elongation at break.

BACKGROUND

Historically, airbags have been coated with one or more layers of polymeric material to enhance their performance, for example, by preventing the unwanted permeation of air through the fabric and, to a lesser extent, by protecting the fabric from detriment due to exposure to hot gases used to inflate the bags. Polychloroprene was the polymer of choice in the early development of airbags. However, it was subsequently discovered that, when exposed to heat, polychloroprene tends to degrade and to release the components of hydrochloric acid, thereby potentially introducing hazardous chemicals into the surroundings and degrading the fabric component. This degradation issue, coupled with the desire to decrease the folded size of the completed airbag by using less coating material, has led to the almost universal replacement of polychloroprene with silicone-based materials for use as airbag coatings.

Newer designs for airbags, particularly those being placed in the sides of passenger compartments, have introduced the requirement that the bags hold pressure longer under use. The requirement of longer air retention and the use of the lower coating levels of silicone polymer have begun to highlight the effect that a naturally lubricating silicone coating may allow the yarns from which the fabric is constructed to shift when a sewn seam is put under stress. This shifting can lead to leakage of the inflating gas through the pores formed from the shifting yarns or, in drastic cases, can cause the seam to fail. Since the airbag must retain its integrity during a collision event in order to sufficiently protect the driver or passenger, there is a great need to provide coatings that provide both effective air retention characteristics and sufficient restriction of yarn shifting for the airbag to function properly.

As mentioned above, in recent years, silicone coatings have been utilized to provide such desired permeability and strength characteristics. However, the relative cost of such coating materials (such as polydimethylsiloxane) is sufficiently high that new, more inexpensive alternatives are being sought. Thus, there exists a need for providing good adhesion and a strong bond between the individual yarns, in order to effectuate long-term rigidity of the fabric to prevent unraveling at cut edges or at seams, while simultaneously providing aging stability and excellent low air permeability characteristics.

To provide a cost-effective and functional replacement for coatings containing only silicone, multi-layer coating systems have been developed. Materials used to create such coatings include polymers such as polyurethane, acrylics, and the like, which are used either alone or in combination with silicone.

For example, U.S. Pat. Nos. 6,239,046 and 6,641,686, both to Veiga et al., describe the use of a two-layer airbag coating, where the fabric-contacting layer is an adhesive polyurethane and the top layer is an elastomeric polysiloxane. Another approach, described in U.S. Pat. No. 6,734,123 to Veiga et al., uses multiple layers of polyurethane as the airbag coating material. In this instance, layers of adhesive polyurethane and elastomeric polyurethane are employed to achieve the desired properties. Yet another multi-layer coating system is provided in U.S. Pat. No. 6,770,578 to Veiga, in which a prime coat of polyurethane is applied to an airbag fabric, followed by one or more layers of polymer film. Such polymer films are formed of polyurethane, polyamide, or polyolefin. None of these references, however, teach a hybrid resin used as an airbag coating.

Other efforts to create multi-component airbag coatings have focused on combining silicone with different polymers in the same polymer network. U.S. Pat. Nos. 6,348,543; 6,468,929; and 6,545,092, all to Parker, describe the production of an airbag coating made of a vinyl-containing polysiloxane cross-linked to, or admixed with, an ethylene-containing copolymer, such as ethylene methyl acrylate or ethylene vinyl acetate. In an alternate approach, described in U.S. Pat. No. 6,846,004 to Parker, a silicone polymer is combined with a copolymer of ethylene and at least one polar monomer in the presence of a volatile solvent and, optionally, a curing catalyst. Yet another approach, which is described in US Patent Application Publication No. 2005-0100692 to Parker, involves coating the airbag fabrics with the cross-linked reaction product of a vinyl-containing silicone and a copolymer having silicone and non-silicone substituents, which may or may not have terminal Si—H groups.

One issue with these systems is the difficulty of forming a uniform blend of the selected polymers. Moreover, a simple blend of polymers does not result in the molecular "interlacing" that is characteristic of the presently desired IPN, because most polymer resins are not compatible with each other. When different resins are simply blended together, they have a tendency to form adjacent, but separate, domains. Most often, these polymers have been polymerized individually prior to being combined with another polymer. Each resin component forms its own domain in the blend, resulting in areas of the coating with different physical properties (such as melting point or flash temperature). When considered as a whole, the blend typically exhibits properties that are a compromise of the bulk properties of the individual resins. The interfaces between two different resin domains are the weak points of the blend, which may contribute to poor mechanical properties and poor long-term stability of the resin blend.

To overcome the issues with simple blends of polymers, hybrid polymer resins have been developed. Hybrid polymer resins are mixtures of at least two different polymer resins, which are combined in such a way as to form an interpenetrating polymer network (IPN). Such interpenetrating networks result from the two resin materials interlocking with each other on a molecular level, thus providing superior properties (such as abrasion and toughness) as compared to a corresponding simple blend made without forming an IPN structure. Often, these hybrid resins include resins having different physical or chemical properties, such as flame retardance, that are desired when the hybrid resin is used as a coating for textile substrates.

IPNs can be produced using a number of different methods. They can be formed by dissolving one monomer into another polymer resin, followed by polymerization of the monomer in the other polymer matrix. IPNs can also be made by sequential or simultaneous polymerization of an intimate mixture of two or more different monomers. One can also mix two pre-polymers to form an intimate mix and post-polymerize the pre-polymers such that the final polymers form an IPN structure. Finally, one can mix two polymers together, either in melt or in solution, to form an intimate mixture and subsequently cross-link at least one of the polymers.

SUMMARY

The present disclosure is directed to the use of specific hybrid resins as airbag coatings. Preferably, the polymers used to create these hybrid resins, as described herein, are urethanes blended with acrylates, vinyls, silicones, and combinations thereof, where at least one of the components has a glass transition temperature of 20° C. or less. The urethanes are preferably of the polycarbonate, polytetramethyleneglycol, silicon-based diol, or olefin-based diol type. The hybrid resins may be produced in an aqueous dispersion, in a solvent, or by mixing the polymers together where one polymer is dissolved directly into a second polymer to form a continuous matrix. The resulting hybrid resins exhibit a tensile strength of at least 1,000 p.s.i. and an elongation at break of at least about 200%.

DETAILED DESCRIPTION

Interpenetrating polymer networks, as described above, are typically formed in an aqueous dispersion in a reaction vessel. IPNs may also be formed in situ on a fabric, although this approach is less preferred due to the volatility of the monomer components and difficulties in purging oxygen during a continuous web manufacturing process.

Urethane/Acrylate Hybrid Resin

In a first embodiment, the interpenetrating polymer network is formed from urethane combined with an acrylate to form a hybrid. The urethane component of the hybrid resin provides high tensile strength and toughness, preferably possessing a tensile strength of at least 1000 p.s.i. The acrylate component, which is typically less expensive than the urethane component, provides softness and aging stability to the hybrid resin. By forming such a hybrid resin from a high strength urethane and a soft, less costly acrylate, an air bag coating is created, which exhibits better performance than either component used individually or than a simple, non-hybrid blend of the two components, in terms of bag flexibility, aging stability, and gas pressure retention. Further, this enhanced performance is achievable at low coating weights (corresponding to lower production costs).

To produce the desired high strength polyurethane mentioned above, it is necessary to select the appropriate starting materials (polyol, isocyanate, and chain extenders), molar ratios (especially the ratio of polyol to isocyanate), and reaction conditions. The molar ratio of polyol to isocyanate is preferably on the order of 0.5:1 to 0.98:1.

Preferred polyols for producing a polyurethane include polycarbonate polyols, polytetramethylene glycol, silicon-based diols, olefin-based diols, and combinations thereof. Exemplary silicon-based diols include compounds having the chemical structure:

where $R_1$ and $R_4$ are selected from the group consisting of aromatic and aliphatic radicals and where $R_2$ and $R_3$ are selected from the group consisting of methyl radicals, hydroxyl radicals, phenyl radicals, and hydrogen. Olefin-based diols include compounds having a polyethylene, a polypropylene, or a polyolefin copolymer, where the copolymer has a hydroxyl group in a terminal and/or side chain position.

Aliphatic isocyanates are preferred, due to their color stability and heat stability. Suitable isocyanates include, but are not limited to, 1,6-hexamethylene diisocyanate (HDI), isophorane diisocyanate (IPDI), hydrogenated methylenediphenyl diisocyanate (HMDI), and $\alpha,\alpha,\alpha',\alpha'$-tetramethyl-m-xylene diisocyanate (m-TMXDI).

The urethane/acrylate hybrid is prepared by polymerizing a urethane pre-polymer and an acrylic monomer. In one preferred embodiment, a di-isocyanate compound is mixed with a polymer diol and a carboxylic acid or sulfonic acid compound containing two hydroxyl groups per molecule, using an isocyanate to hydroxyl molar ratio of 1 to 0.5 to about 1 to 0.98, optionally with a catalyst, such as an organo-tin compound or a tertiary amine. The mixture is then heated to a temperature in range of 40° C. to 200° C. in the absence of moisture (preferably in inert atmosphere, such as dry nitrogen and argon gas) for an amount of time sufficient to allow substantial complete conversion of the hydroxyl groups into urethane linkage to form a polyurethane pre-polymer with isocyanate end group.

Preferred acrylates, for incorporation into a hybrid resin, include those with low glass transition temperatures and good aging stability. Hybrid resins formed using acrylates with lower glass transition temperatures exhibit greater flexibility at low temperatures, which further enhances the ability to pack the coated airbag into its module. The glass transition temperature of a polyacrylate is determined by contributions of its corresponding monomers, when more than one monomer is used to make the polyacrylate. The glass transition temperature of the homopolymer of at least one acrylate monomer is preferably less than about 0° C. and, more preferably, less than about −10° C. The glass transition temperature of the acrylate component is preferably in the range of from about −60° C. to about 10° C.; more preferably, less than 0° C.; and most preferably, −10° C. or less.

Preferred acrylate components include polyacrylates having monomers of ethyl acrylate, methyl methacrylate, butyl acrylate, styrene, acrylonitrile, ethylhexyl acrylate, lauryl acrylate, methacrylopropyl trimethoxysilane, methylol acrylamide, and combinations thereof. A typical soft polyacrylate resin made from free-radical polymerization has a tensile strength of less than 900 p.s.i. One such commercially available resin—RHOPLEX® TR-3082, which is available from Rohm & Haas—has a tensile strength of about 430 p.s.i., a glass transition temperature of about −20° C., and an elongation at break of about 620%.

Once the urethane pre-polymer is produced (as described above), it is mixed with at least one acrylic monomer or oligomer, and the temperature is lowered into the range of between about 20° C. and about 100° C. If a dihydroxy carboxylic acid is used in making the urethane pre-polymer, a base, such as potassium hydroxide or an organic amine, and a dispersant/surfactant may also be included. An example of a suitable organic amine is triethylamine (or dimethyl ethanolamine). The mixture of urethane pre-polymer and acrylate monomer is then added to water while stirring. A diamino organic compound (commonly referred to as a "chain extender") is also added to water at this time, which reacts with the isocyanate end group of the urethane pre-polymer to further increase the molecular weight and physical properties of the urethane component. A stable aqueous dispersion of urethane and acrylate monomer is thus obtained.

A cross-linking acrylate monomer may also be included in the dispersion described above. The cross-linking monomer may induce cross-linking of the resulting polyacrylate and/or polyurethane components. Examples of suitable cross-linking monomers include N-methylol acrylamide, N-methylol methacrylamide, acrylic acid, methacrylic acid, divinyl benzene, and other multi-functional acrylate and methacrylate monomers. Alternatively, cross-linking may be achieved through such multi-functional cross-linking agents as epoxy resins, amino resins (such as melamine formaldehyde resin or urea formaldehyde resin), polyisocyanates, polycarbodiimides, and blocked polyisocyanates.

The dispersion is then purged with an inert gas, such as nitrogen and argon to remove any oxygen. A free radical initiator, such as 2,2'-azodiisobutylnitrile (AIBN) or a mixture of potassium sulfate and sodium disulfite, is then added to the dispersion to initiate free radical polymerization of acrylate monomer at a temperature in the range of between about 50° C. and about 90° C. Because the acrylate monomer is intimately mixed with the urethane polymer, the acrylate polymer polymerized in this manner has molecular level mixing with the urethane polymer. In other words, the acrylate polymer and urethane polymer forms an IPN.

Polyurethane/polyacrylate hybrids, as provided above, may be made to have mechanical properties similar to a polyurethane resin, but with better softness and at lower cost. One such commercially available resin—RU 6000, available from Stahl USA—is a polyacrylate/polyurethane hybrid produced by a process similar to that described above. This hybrid exhibits a tensile strength of about 3345 p.s.i. and an elongation at break of about 415%.

Urethane/Acrylate Hybrid Resins (Solvent-Based)

In a second embodiment, an IPN resin is formed using an organic solvent (instead of creating an aqueous dispersion). Using this approach, urethane and an acrylate polymer or copolymer are dissolved in an organic solvent, such as N-methylpyrrolidone, dimethylforamide, cyclohexanone, toluene, isopropyl alcohol, methyl ethyl ketone, or the like, to form an intimate molecular mixture. The urethane may be either a fully reacted polymer or pre-polymer, which is produced as described above. The mixture is then applied to an airbag fabric using any known coating methods. The solvent is then evaporated at a temperature of between about 60° C. and about 200° C., such that at least part of the acrylate polymer and urethane mixture forms an IPN. A cross-linking agent and adhesion promoter, such as isocyanate, epoxy, and polycarbodiimide, may further be included in the coating mixture.

One or both of the polyurethane component and the acrylate component may contain a reactive group that allows the components to react with each other during the drying process, thereby preventing the components from forming largely two separate phases without the production of an IPN (that is, preventing the formation of a simple blend). Compatilizers, such as a copolymer of polyurethane containing an acrylate moiety or a copolymer of acrylate containing a urethane moiety, may also be included to facilitate the formation of the hybrid resin. In one embodiment, the polyurethane component contains a reactive isocyanate end group, and the polyacrylate component contains a reactive hydroxyl group, which is created by including hydroxyethyl acrylate, for example, in the monomer mix. When these the polyurethane and polyacrylate components are mixed together at a molecular level in an organic solvent (or solvent mixture), the components react with each other to form chemical linkages that prevent phase separation from occurring, even after the organic solvent(s) are evaporated.

In one potentially preferred version of the first and second embodiments, a polycarbonate urethane pre-polymer is made by using a polycarbonate diol, an aliphatic diisocyanate, dimethylolpropionate, with triethylamine as the neutralizing base. In another version, a polyether diol (such as polytetramethylene glycol) and an aliphatic isocyanate are used to make a polyether urethane pre-polymer. Preferred acrylate monomers, for use with either a polycarbonate urethane pre-polymer or a polyether urethane pre-polymer, include ethyl acrylate, methyl methacrylate, butyl acrylate, styrene, acrylonitrile, ethylhexyl acrylate, lauryl acrylate, methacrylopropyl trimethoxysilane, methylol acrylamide, and combinations thereof. It is also preferred that an oligomer of urethane acrylate, an epoxy acrylate, and/or a silicone acrylate is included in the hybrid resin, either alone or with an acrylate monomer.

Urethane/Vinyl Hybrid Resins

In a third embodiment, the acrylate polymer is replaced with a vinyl polymer, which results in an IPN that is a urethane/vinyl hybrid. Examples of suitable vinyl compounds include vinyl esters (such as vinyl acetate), vinyl hexanoate, vinyl chloride, vinyl alcohol, vinyl butyrate, vinylidene chlorine, vinylidene fluoride, vinyl formade, vinyl pyrrolidone, and other vinyl monomers capable of polymerizing in the presence of a free radical initiator. The manufacturing processing for these polymers is the same as that described for the acrylate polymers.

Polyurethane/vinyl hybrids may also be produced using the process disclosed in U.S. Pat. No. 5,571,681, which is hereby incorporated by reference, by combining (i) polyols that are stable to heat and humidity aging and (ii) a vinyl component that has a glass transition temperature of 10° C. or less. Suitable polyols for this combination include polycarbonate polyols, polytetramethylene glycol, and polypropylene glycol.

Urethane/Acrylate/Vinyl Hybrid Resins

Alternately, a combination of acrylate and vinyl polymers may be polymerized after combination with a urethane pre-polymer to form an IPN having three molecularly bonded polymers.

As mentioned above, the urethane pre-polymer is formed by mixing a di-isocyanate compound with a polyol and a carboxylic acid or sulfonic acid compound. Although the di-isocyanate compound can be selected from aliphatic and aromatic isocyanates, aliphatic isocyanates are preferred in this embodiment. Suitable aliphatic isocyanates include, but are not limited to, 1,6-hexamethylene diisocyanate (HDI), isophorane diisocyanate (IPDI), hydrogenated methylenediphenyl diisocyanate (HMDI), and α,α,α',α'-tetramethyl-m-xylene diisocyanate (m-TMXDI).

Suitable polyols include, but are not limited to, polytetramethylene glycol, polyhexamethylene carbonate glycol, linear or branched polyolefins with hydroxyl end groups, polyesters with hydroxyl end groups, and polydimethylsiloxane compounds with hydroxyl end groups. Specifically, polydimethylsiloxane compounds having the structure

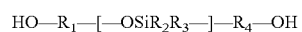

may be successfully employed, where $R_1$ and $R_4$ are selected from the group consisting of aliphatic and aromatic radicals and where $R_2$ and $R_3$ are selected from the group consisting of methyl radicals, hydroxyl radicals, phenyl radicals, and hydrogen. Other polyols, such as polypropylene glycol and polyethylene glycol, may also be used, but only as minor components due to their poor resistance to oxidation.

Carboxylic acids or sulphonic acid compounds with hydroxyl functionality are particularly well suited as internal emulsifying components to facilitate aqueous dispersion of the polyurethane and polyurethane/acrylate hybrid. One example of a suitable carboxylic acid with dihydroxyl groups is dimethylolpropionic acid. Such an acid compound reacts with the diisocyanate compound and the polyol to form a polyurethane that is capable of being dispersed in water with good dispersion stability.

Suitable catalysts for the reaction between the isocyanate and the polymer diol include tertiary amines, organic tin compounds, and other catalysts known for this purpose.

Acrylate monomers useful in combination with the urethane pre-polymer described above include monomers of ethyl acrylate, methyl methacrylate, butyl acrylate, acrylonitrile, ethylhexyl acrylate, lauryl acrylate, methacrylopropyl trimethoxysilane, methylol acrylamide, combinations thereof, and other similar monomers that are capable of polymerizing via free radical mechanism. Suitable vinyl monomers are provided above. Oligomers of acrylate monomers and vinyl monomers may also be used in making the IPN resin. Mono-, di-, tri-, and polyfunctional oligomers of acrylate, urethane acrylate, epoxy acrylate, polyester acrylate, polyether acrylate, silicone acrylate, and the like are also suitable for mixing with polyurethane pre-polymer to form IPN resin. Finally, additional monomers, such as ethylene, butadiene, isoprene, and chloroprene, may be included to copolymerize with the monomers and oligomers described above.

Urethane/Silicone Hybrid Resins

In yet another embodiment, a silicone and urethane IPN is produced by mixing polyurethane (having a vinyl, acrylate, or a methyl hydro silyl group) with an addition-cure silicone mixture. Both the polyurethane and silicone are blended and are cured simultaneously to form an IPN resin. It is believed that some covalent linkage exists between the urethane and silicone polymers in the IPN mixture, which further stabilizes the IPN structure and improves the mechanical properties of the IPN. Similarly, an oligomer of urethane acrylate, epoxy acrylate, polyester acrylate, and the like may also be mixed with a silicone resin to form an IPN hybrid, optionally in the presence of a solvent.

In one embodiment, a urethane having methacrylate functionality is combined with an addition-cure, two-part silicone rubber resin, having a platinum catalyst system. The urethane/silicone mixture is then applied to an airbag fabric using any known application methods to achieve a wet coating weight of between about 0.7 ounces per square yard and about 3.0 ounces per square yard. One potentially preferred application method to achieve this desired add-on level is scrape-coating with a floating knife. The coating is then cured in an oven at a temperature in the range of about 300 F to about 400 F. The methacrylate component of the urethane is co-cured with the silicone resin through the formation of a methylhydrosiloxane group in the presence of a platinum catalyst. The reaction is shown below:

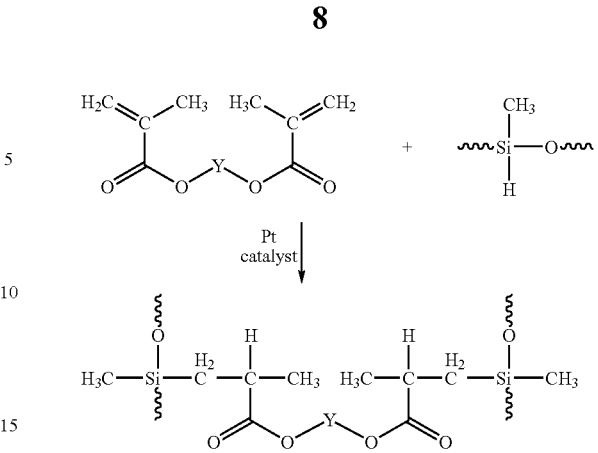

where Y is a polyurethane segment represented by the chemical structure

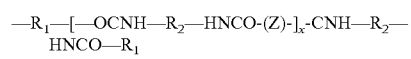

where $R_1$ and $R_2$ are selected from the group consisting of aliphatic and aromatic radicals; where Z is selected from the group consisting of polyethers, polycarbonates, polydimethylsiloxanes, polyolefins, and combinations thereof; and x is a number greater than 1.

Silicone is a soft polymer having a glass transition temperature of $-60°$ C. or less. Silicone resins do not possess a high tensile strength or a high tear strength. However, when polyurethane is combined with silicone in the manner described above to form an IPN, the polyurethane component provides the desired high strength to the coating composition, without adversely affecting the softness of the coating. These contradictory objectives are thus met by IPNs formed in accordance with the teachings herein. In contrast, simple blends of urethane with silicone usually result in a coating with poorer mechanical properties than either of the components alone.

Additives

The hybrid resins described herein are particularly suitable for coating airbag fabrics and airbags. The hybrid resin may be formulated into a coating composition by including one or more of the following optional additives: heat stabilizers, antioxidants, cross-linking agents, rheology modifiers, flame retardants, solvents, adhesion promoters, anti-blocking agents, colorants, and the like.

The hybrid compounds may also include diamino compounds, commonly referred to as chain extenders, which are typically added to the reaction products of diisocyanate and polyols to further increase the molecular weight of the polyurethane resin. Diamino-compounds include any organic molecule having two primary amine groups, such as ethylenediamine, hexamethylenediamine, hydrazine, and the like.

Application to Airbag Fabrics

The coating composition is then applied to an airbag fabric by any known coating methods, including floating knife coating, knife over roll coating, spray coating, impregnation coating, curtain coating, reverse roll coating, transfer roll coating, and screen coating. The coating is then dried at a temperature in the range of $60°$ C. to $200°$ C. and, more preferably, at a temperature in the range of $120°$ C. to $180°$ C., and optionally cured if a cross-linking agent is used. The add-on weight of the coating composition, when dry, is preferably between 0.3 oz/yd$^2$ and 3.0 oz/yd$^2$ and, more preferably, is between 0.6 oz/yd$^2$ and 1.5 oz/yd$^2$.

The present IPN coatings may also be used in combination with other coatings either by incorporating the IPN resin as one component along with other coating materials or using the IPN coating as one layer of a multi-layer coating system. A hybrid resin may also be used as a compatibility agent—for example, for a polyurethane and polyacrylate resin blend—to improve coating properties of the resin blend. Additionally, the present IPN resin may be used as a primer coating on an airbag fabric, to which a secondary coating layer is applied. Alternately, the IPN resin may be used as a monolithic layer or as a top coat for a primer system having two layers with distinctive properties exhibited by each layer.

The hybrid resins described herein have a tensile strength of at least about 1,000 p.s.i.; more preferably, of at least 2,000 p.s.i.; and most preferably, of at least 3,000 p.s.i. These hybrid resins also exhibit an elongation at break of at least about 200%. In addition to the quality of improved mechanical properties versus simple polymer blends, the hybrid resins provide better aging stability and abrasion resistance than conventional resin blends. Furthermore, the desired properties may be imparted to the airbag with a lower coating add-on level, thus contributing to an airbag module having a lighter weight and lower packed volume. Finally, the costs of producing hybrid resins according to the present approach are lower than those costs associated with 100% silicone coating systems.

For these reasons, the use of the presently described hybrid resins as airbag coating materials represents an advance over the prior art.

EXAMPLE 1

The following components are combined to make a urethane/acrylate hybrid resin:

| | |
|---|---|
| Polycarbonate urethane/acrylate hybrid resin (e.g., RU6000 hybrid resin with 40% solids from Stahl USA) | 50 parts by weight |
| Water | 27 parts by weight |
| Dispersion of decabromodiphenyl oxide (70% solids) (acts as a flame retardant) | 20 parts by weight |
| 50% active aqueous dispersion of tetrakis[(methylene-(3,5-DiTert-butyl-4-hydroxyhydro-cinnamate)] methane (acts as antioxidant; e.g., BOSTEX ® 537 from Akron Dispersions) | 2 parts by weight |
| Thickener (e.g., NATROSOL ® 250 HHXR from Hercules Inc.) | 1 part by weight |

When combined, the above components form a thickened liquid. This liquid is then scrape-coated onto a 420-denier 49×49 plain woven, nylon 6,6 air bag fabric using a sharp-edge floating knife with a wet coating weight of about 1 ounce per square yard. The coating is then dried immediately in a 350° F. oven for about 1.5 minutes. The resulting dry coating weight is about 0.25 ounces per square yard.

The resulting coated fabric has 0 cfm air permeability, when tested according to ASTM D-737 "Air Permeability of Textile Fabrics" standards. The fabric is also pliable, thus permitting folding into small package size. The fabric is then cut and sewn into an airbag with the coated side positioned toward the interior of the bag. Compared to a silicone coated airbag, the fabric of Example 1 exhibits much improved combing resistance.

EXAMPLE 2

The following components are combined to make another urethane/acrylate hybrid resin:

| | |
|---|---|
| Polycarbonate urethane resin (e.g., RU 40-350 resin from Stahl USA) | 40 parts by weight |
| Polyacrylate resin (e.g., RHOPLEX ® TR3082 resin from Rohm & Haas) | 39 parts by weight |
| Polycarbonate urethane/acrylate hybrid resin (e.g., RU6000 hybrid resin with 40% solids from Stahl USA) | 20 parts by weight |
| Thickener (e.g., CARBOPOL ® PKS from Noveon Corporation) | 1 part by weight |

When combined, the above components form a thickened liquid. This liquid is then scrape-coated, using a floating knife with a round bottom and a wet coating weight of about 2 ounces per square yard, onto both sides of a one-piece Jacquard woven airbag formed of nylon 6,6 yarns. The coating is then dried immediately in a 350° F. oven for about 1.5 minutes. The resulting dry coating weight is about 0.8 ounces per square yard on each side of the Jacquard woven airbag fabric. Talc powder is applied to both sides of the coated airbag to provide lower sliding friction and non-blocking characteristics.

It is believed that this hybrid resin facilitates stronger interaction and more uniform blend morphology between the three different polymer components. As a result, the coated airbag exhibits tensile strength similar to polyurethane alone, flexibility similar to acrylate alone, and low overall costs. Airbags made using this type of hybrid resin exhibit very low leakage rates, even when inflated to pressures of 10-20 p.s.i., making them well suited for use as side-curtain airbags for roll-over protection.

EXAMPLE 3

The following mixture was created:

| | |
|---|---|
| Polycarbonate urethane/acrylate hybrid resin (RU6000 hybrid resin with 40% solids from Stahl USA) | 98.5 parts by weight |
| Thickener (CARBOPOL ® PKS from Noveon Corporation) | 1.5 parts by weight |

This liquid is then scrape-coated, using a round-edge floating knife at a wet coating weight of about 2 ounces per square yard, onto both sides of a one-piece Jacquard woven airbag formed of nylon 6,6 yarns. The coating is then dried immediately in a 300° F. oven for about 2 minutes. The resulting dry coating weight is about 0.8 ounces per square yard on each side of the Jacquard woven airbag fabric.

Next, a 100% solids, 2-part, addition-cure silicone resin was scraped onto the polyurethane/polyacrylate coating layer at a coating weight of about 0.9 ounces per square yard. The coating was then dried at 360 F for about 2 minutes.

The coated airbag, which had an inflated volume of about 0.2 cubic feet, was then inflated to an air pressure of 10 p.s.i. The airbag exhibited a leakage rate of 8 standard cubic feet per hour at 10 p.s.i. It took 12 seconds for the airbag to deflate from 10 p.s.i. to 8 p.s.i., indicating that the leak-down time was about 90 seconds.

We claim:

1. An airbag fabric comprising a fabric substrate and a polymer coating applied to at least one side of said fabric substrate, wherein said polymer coating comprises an interpenetrating network (IPN) of at least two resin components, the IPN being comprised of:
   (i) a first component, said first component being a urethane comprising at least one polyol segment selected from the group consisting of polytetramethyleneglycol, polycarbonate, silicon-based diol, and olefin-based diol; and
   (ii) a second component, said second component being selected from the group consisting of polyacrylates, polymethacrylates, vinyl polymers, and combinations thereof;
   wherein said polymer coating is characterized by a tensile strength of at least 1000 p.s.i. and wherein at least one component is characterized by a glass transition temperature of about 20° C. or less.

2. The airbag fabric of claim 1, wherein said urethane is a polycarbonate urethane.

3. The airbag fabric of claim 1, wherein said urethane is a polyether urethane.

4. The airbag fabric of claim 1, wherein said second component is a polyacrylate.

5. The airbag fabric of claim 4, wherein said polyacrylate comprises monomers of ethyl acrylate, methyl methacrylate, butyl acrylate, styrene, acrylonitrile, ethylhexyl acrylate, lauryl acrylate, methacrylopropyl trimethoxysilane, methylol acrylamide, and combinations thereof.

6. The airbag fabric of claim 1, wherein said second component is a vinyl polymer.

7. The airbag fabric of claim 1, wherein said second component contains at least one homopolymer having a glass transition temperature of less than 0° C.

8. The airbag fabric of claim 1, wherein said IPN of at least two resin components exhibits an elongation at break of about 200%.

9. The airbag fabric of claim 1, wherein said fabric is incorporated into a one-piece woven airbag.

10. The airbag fabric of claim 1, wherein said fabric is incorporated into a cut-and-sewn airbag.

11. The airbag fabric of claim 1, wherein said coating has a dry weight in the range of about 0.3 oz/yd$^2$ to about 3.0 oz/yd$^2$.

* * * * *